United States Patent [19]

Hornbaker et al.

[11] 4,116,922

[45] Sep. 26, 1978

[54] REINFORCED POLYPIVALOLACTONE

[75] Inventors: Edwin D. Hornbaker; Jesse D. Jones; Michael E. Kucsma; Thomas S. Allen, all of Baton Rouge, La.

[73] Assignee: Ethyl Corporation, Richmond, Va.

[21] Appl. No.: 849,337

[22] Filed: Nov. 7, 1977

[51] Int. Cl.$^2$ ............................................... C08K 3/40
[52] U.S. Cl. ........................... 260/40 R; 260/29.1 SB; 260/37 R
[58] Field of Search ............. 260/40 R, 37 R, 29.1 SB

[56] References Cited

U.S. PATENT DOCUMENTS

| | | | |
|---|---|---|---|
| 3,268,486 | 8/1969 | Klootwijk | 260/78.3 |
| 3,471,456 | 10/1969 | Klootwijk et al. | 260/78.3 |
| 3,549,586 | 12/1970 | Smith et al. | 260/40 R |
| 3,734,936 | 5/1973 | Brown et al. | 260/37 R |
| 3,814,725 | 6/1974 | Zimmerman et al. | 260/40 R |
| 3,833,534 | 9/1974 | Tierney et al. | 260/37 N |
| 3,835,089 | 9/1974 | Fox et al. | 260/40 R |

*Primary Examiner*—Eugene C. Rzucidlo
*Attorney, Agent, or Firm*—Donald L. Johnson; John F. Sieberth; David L. Ray

[57] ABSTRACT

Improved thermoplastic compositions comprising glass fibers blended with polypivalolactone, and a process for producing these compositions.

46 Claims, No Drawings

REINFORCED POLYPIVALOLACTONE

BACKGROUND OF THE INVENTION

This invention relates to improved thermoplastic polyester compositions and a method for producing the compositions. The improved thermoplastic compositions comprise an intimate blend of a glass fiber reinforcing filler with polypivalolactone. The easily processable thermoplastic compositions of the invention have significant property advantages over other reinforced polyester molding resins.

It is well known in the art to improve the physical properties of thermoplastics through glass fiber reinforcement. Strength, stiffness and toughness can be considerably enhanced, and particularly in the case of crystallizable thermoplastics, the resistance to deformation at elevated temperature can be markedly increased. However, when polypivalolactone is reinforced with commercial grades of glass fiber normally used successfully to improve the properties of thermoplastic polyesters, only a minimal increase of strength and toughness is realized. The extent of strength improvement is, in fact, sufficiently small that the polypivalolactone reinforced in the conventional way is not broadly useful for engineering thermoplastic applications.

Polypivalolactone is a thermoplastic polyester having many desirable properties for engineering thermoplastic applications, such as outstanding hydrolytic, thermal and chemical stability, excellent weatherability and relatively high resistance to deformation at elevated temperatures. However, it is somewhat deficient in strength and stiffness for broad usage in engineering thermoplastic applications, where the demanding cases require substantial strength at ambient temperatures and, even more importantly, retention of a considerable degree of strength at elevated temperatures. Since polypivalolactone does exhibit significant advantages over other thermoplastic polyesters, there is a need for a glass reinforced polypivalolactone having acceptable strength properties.

SUMMARY OF THE INVENTION

In accordance with the present invention there are provided glass fiber reinforced polypivalolactone compositions, and methods for their production, with very good strength and toughness at ambient temperatures and a degree of strength retention and deformation resistance at elevated temperature comparable to or better than commercial thermoplastic polyesters. Such polypivalolactone compositions are obtained by the incorporation of substantial amounts of certain types of silane coupling agents into the blend of polymer and glass fiber reinforcement. The thermoplastic compositions of the invention exhibit improved resistance to deformation at elevated temperatures, excellent surface appearance, and improved toughness. Furthermore, the compositions of the invention have a very acceptable degree of strength and stiffness at ambient temperatures, excellent processability, and low mold shrinkage.

DESCRIPTION OF THE PREFERRED EMBODIMENTS

The preparation of polypivalolactone is described in numerous U.S. patents, exemplary of which are U.S. Pat. Nos. 3,268,486 and 3,471,456, which are hereby incorporated by reference. The polypivalolactone useful in the present invention has a preferred viscosity range, the viscosity being indicated by the limiting viscosity number (hereinafter referred to as LVN). The LVN is a property well known in the art and is defined in Billmeyer, Textbook of Polymer Science (Interscience, N.Y., 1965), pp. 79–81. LVN was determined herein in benzyl alcohol at 150° C.

The polypivalolactone employed in the present invention preferably has an LVN of from about 0.8 to about 2.5. More preferably, the LVN of the polypivalolactone employed in the present invention ranges from about 0.9 to about 2.3, the most preferred polypivalolactone having an LVN of from about 0.9 to about 1.6.

The glass fiber reinforcing fillers useful in the present invention have an average length of from about 1/16 to about ½ inch. Preferably, the glass fibers useful in the compositions of the invention have a length of from about ⅛ to about ¼ inch.

The amount of glass fiber can range from greater than 15 weight percent to about 60 weight percent, based on the total weight of the molding compound. Preferably, the glass fiber ranges from about 20 weight percent to about 50 weight percent, based on the total weight of the molding compound.

An essential material in the preparation of the reinforced polypivalolactone compositions of the invention is the coupling agent which binds the reinforcing filler to the polymer. While a very broad range of silane compounds has been previously used as coupling agents for reinforced thermoplastics, organosilane compounds useful in the present invention are limited to those substituted silanes of the formula

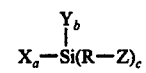

where X is a hydrolyzable group capable of reaction with a hydroxyl group, Y is hydrogen or a monovalent hydrocarbon group, R is a divalent hydrocarbon group having from 1 to about 20 carbon atoms, Z is a primary or secondary amino or epoxy group or secondary amino monohydrogen halide, "a" is an integer from 1 to 3, "b" is an integer from 0 to 2, "c" is an integer from 1 to 3, and the sum of $a + b + c = 4$. Preferably "a" is equal to 3, "b" is equal to 0, and "c" is equal to 1.

Exemplary of the many suitable X groups include halogen and hydroxy groups as well as alkoxy, cycloalkoxy, aryloxy, alkoxy-substituted alkoxy such as β-methoxyethoxy, alkoxycarbonyl, aryloxycarbonyl, alkyl carboxylate and aryl carboxylate groups, preferably having eight or less carbon atoms, and the like. Exemplary of the many suitable Y groups in the above formula are hydrogen, methyl, ethyl, vinyl, isobutyl, phenyl, other hydrocarbyl groups, preferably having ten or less carbon atoms, and the like. The R groups can be any divalent hydrocarbon group having up to about 20 carbon atoms, preferably from about 2 to about 18 carbon atoms. Exemplary of the many suitable R groups are ethylene, propylene, isobutylene, decylene, undecylene, octadecylene, phenylene, toluene, and the like.

The Z group is separated from the silicon atom by an R group having at least 2 carbon atoms in the linking chain. Exemplary of suitable Z groups are primary or secondary amino or epoxy groups, or secondary amino monohydrogen halides. Among the Z groups suitable for use herein, the primary amino, secondary amino monohydrogen halides, and the epoxy groups are particularly preferred.

Preferred coupling agents are γ-aminoalkyltrialkoxysilanes such as γ-aminopropyltrimethoxysilane, γ-aminopropyltriethoxysilane, γ-aminobutyltrimethoxysilane, γ-aminobutyltriethoxysilane, γ-aminoundecyltrimethoxysilane, γ-aminoundecyltri-n-butyoxysilane, and the like; γ-glycidoxyalkyltrialkoxysilanes such as γ-glycidoxypropyltrimethoxysilane, γ-glycidoxypropyltriethoxysilane, γ-glycidoxypropyltributoxysilane, γ-glycidoxybutyltrimethoxysilane, γ-glycidoxybutyltriethoxysilane, γ-glycidoxybutyltributoxysilane, γ-glycidoxyundecyltrimethoxysilane, γ-glycidoxyundecyltriethoxysilane, γ-glycidoxyundecyltributoxysilane, and the like; N-β-(aminoethyl)-γ-aminoalkyltrialkoxysilanes such as N-β-(aminoethyl)-γ-aminopropyltrimethoxysilane, N-β-(aminoethyl)-γ-aminopropyltributoxysilane, N-β-(aminoethyl)-γ-aminopropyltriethoxysilane, N-β-(aminoethyl)-γ-aminobutyltrimethoxysilane, N-β-(aminoethyl)-γ-aminobutyltributoxysilane, N-β-(aminoethyl)-γ-aminobutyltriethoxysilane, N-β-(aminoethyl)-γ-aminoundecyltrimethoxysilane, N-β-(aminoethyl)-γ-aminoundecyltributoxysilane, N-β-(aminoethyl)-γ-aminoundecyltriethoxysilane, and the like; 3,4-epoxycyclohexylethyltrimethoxysilane, and N-β-(N-vinylbenzylamino)ethyl-γ-aminopropyltrimethoxysilane monohydrogen chloride.

The concentration of the coupling agent can range from about 0.1 to about 2 weight percent, based on the total weight of the molding compound. Preferably, the coupling agent ranges from about 0.2 to about 1 weight percent, based on the total weight of the molding compound.

Although not essential, it is preferred to use a nucleating agent in the compositions of the present invention to provide maximum toughness. A variety of materials known to be effective as nucleating agents for other crystalline polymers can be used such as metal salts of aromatic or alicyclic carboxylic or sulfonic acids (e.g., lithium benzoate, sodium α-naphthalene sulfonate, sodium cyclohexane carboxylate), salts of aliphatic mono or dibasic carboxylic or sulfonic acids (e.g., sodium caproate, sodium succinate), salts of arylalkyl carboxylic or sulfonic acids (e.g., aluminum phenylacetate), or particulate inorganic materials (clays, silica, titanium dioxide, and the like).

The amount of the nucleating agent can range from about 0.01 to about 3 weight percent based on the total weight of the molding compound. More preferably, the nucleating agent ranges from about 0.1 to about 1 weight percent based on the total weight of the molding compound.

In addition to the glass fiber reinforcing filler, a moderate amount of a particulate filler may be incorporated into the compositions of the instant invention without significant deterioration of strength properties. The term particulate fillers as used herein refers to granular, acicular, plate-like, or somewhat fibrous particles having a maximum particle size of about 900 microns, the particle size of the filler being the largest dimension of the filler particle. The shape of the particulate fillers which may be used may vary from granular to somewhat plate-like or somewhat tubular or oblong. The term aspect ratio is defined as the ratio of the length of the particle to its diameter in the case of acicular or somewhat fibrous particles, but in the case of plate-like particles (particles shaped somewhat like a plate) the aspect ratio (usually referred to as "flake aspect ratio") is defined as the ratio of the average particle diameter to its thickness.

Generally, the preferred particulate fillers which may be incorporated into the compositions of the instant invention will have an average aspect ratio of at least 10. It is more preferred, however, that their average aspect ratio be at least 30.

It is preferred that the amount of particulate filler not exceed about 20 percent of the weight of the total composition. However, this amount of filler may comprise as much as 40 percent of the weight of the total composition without markedly detracting from strength properties, provided that the total glass fiber and particulate filler content of the composition does not exceed 60 percent.

Examples of suitable particulate fillers useful in the practice of this invention include crystalline minerals such as alumina, silica, mullite, and graphite; wollastonite, mica, asbestos (such as amosite, chrysotile or crocidolite) and other metal silicates, phosphates, aluminates, aluminosilicates, sulfates, sulfides, carbides, etc.; other inorganic compounds such as potassium titanate, sodium aluminum carbonate, boron carbide, silicon carbide, silicon nitride and tungsten boride; and amorphous materials such as calcium magnesium aluminum silicate. Examples of the more preferred fillers are wollastonite, mica, calcium sulfate single crystal whiskers, potassium titanate single crystals, fibrous calcium magnesium aluminosilicate, and asbestos.

Other additives for appearance and property improvement can be incorporated into the molding compounds of the present invention such as colorants, antioxidants, stabilizers, flame retardants, and the like. Examples of suitable antioxidants are 1,3,5-trimethyl-2,4,6-tris(3,5-di-tert-butyl-4-hydroxybenzyl)benzene and N-phenyl-β-naphthylamine. Examples of suitable stabilizers are dialkyl sulfides such as dilauryl sulfide or dicetyl sulfide.

The glass fiber reinforcing fillers can be intimately blended with the polypivalolactone by melt blending in extruders or other similar types of mixers.

Physical and mechanical properties in the following examples were determined in accordance with ASTM procedures where applicable: Tensile Strength — D638; Tensile Elastic Modulus — D638; Flexural Strength — D790; Flexural Elastic Modulus — D790; Izod Impact — D256; and Heat Distortion Temperature — D648.

The following examples will serve to illustrate the invention. In Examples 1 through 19, shown in the table, blends were prepared by first dispersing a coupling agent and the reinforcing filler in a mixer. The coupling agent-reinforcing filler mixture was then "cured" by heating the mixture in a circulating hot air oven at 95° C. for 2 hours to aid the reaction between the coupling agent and the reinforcing filler, and to remove all the volatile substances. The "cured" mixture was mixed with the other ingredients. The mixture was then processed on an injection molding machine into parts suitable for grinding into pellets. The pellets were injection molded into test specimens.

Unless otherwise noted, test specimens used in the following examples were injection molded from oblong pellets ranging from approximately ⅛ inch to 5/16 inch in diameter. The pellets were molded into test specimens by a New Britain reciprocating screw injection molding machine in which the mold temperature is maintained at about 165° F. by a circulating water heat exchanger. The barrel temperatures in the machine were set at about 480° F. and test specimens were made with the machine operating semi-automatically with a screw back pressure of about 100 psig, a mold cycle time of about 30 seconds, and an injection time of about 1.0 to 1.5 seconds. The initial several specimens of each composition were discarded and only those specimens made after the machine had equilibrated were tested.

TABLE OF EXAMPLES

| | 1 | 2 | 3 | 4 | 5 | 6 | |
|---|---|---|---|---|---|---|---|
| COMPOSITION (in %): | | | | | | | |
| Polypivalolactone[a] | 99.4 | 99.4 | 69.59 | 69.23 | 69.21 | 69.28 | |
| LVN | 1.4 | 2.1 | 1.4 | 1.4 | 1.4 | 1.4 | |
| Glass fiber[b] | — | — | 29.99 | 29.84 | 19.90 | — | |
| Glass fiber[c] | — | — | — | — | — | — | |
| Glass fiber[d] | — | — | — | — | — | 29.79 | |
| Ca Mg aluminosilicate[e] | — | — | — | — | 9.95 | — | |
| Titanium dioxide | 0.5 | 0.5 | 0.35 | 0.34 | 0.35 | 0.35 | |
| Antioxidant[f] | 0.1[n] | 0.1[n] | 0.07 | 0.07 | 0.07 | 0.07 | |
| Coupling agent A-187[g] | — | — | — | 0.52 | 0.52 | 0.52 | |
| Coupling agent A-186[h] | — | — | — | — | — | — | |
| Coupling agent Z-6020[i] | — | — | — | — | — | — | |
| Coupling agent A-1100[j] | — | — | — | — | — | — | |
| Titanate GT DOPP-1385[k] | — | — | — | — | — | — | |
| Titanate TTOP-12[l] | — | — | — | — | — | — | |
| Cationic silane Z-6032[m] | — | — | — | — | — | — | |
| PHYSICAL PROPERTIES: | | | | | | | |
| Tensile yield strength, psi | 5,510 | 5,390 | 8,100 | 10,700 | 10,200 | 11,300 | |
| Flexural strength, psi | 9,495 | 9,391 | 13,200 | 17,300 | 16,700 | 18,900 | |
| Flexural modulus, 10³ psi | 360 | 290 | 1,170 | 1,140 | 970 | 1,030 | |
| Izod Impact, ¼" bar, ft.-lb./in. | 0.7 | 0.8 | — | — | — | 1.4 | |
| Izod Impact, ⅛" bar ft.-lb./in. | 0.7 | 1.0 | 0.94 | 1.4 | 1.4 | 1.5 | |
| Heat Deflection Temperature, °C | 153 | 133 | 225 | 220 | 216 | 225 | |
| COMPOSITION (in %): | | | | | | | |
| Polypivalolactone[a] | 69.64 | 69.64 | 69.46 | 69.28 | 69.28 | 69.28 | |
| LVN | 1.0 | 2.1 | 2.1 | 2.1 | 2.1 | 2.1 | |
| Glass fiber[b] | — | — | — | — | — | — | |
| Glass fiber[c] | — | — | — | — | — | — | |
| Glass fiber[d] | 29.94 | 29.94 | 29.87 | 29.79 | 29.79 | 29.79 | |
| Ca Mg aluminosilicate[e] | — | — | — | — | — | — | |
| Titanium dioxide | 0.35 | 0.35 | 0.35 | 0.35 | 0.35 | 0.35 | |
| Antioxidant[f] | 0.07 | 0.07 | 0.07 | 0.07 | 0.07 | 0.07 | |
| Coupling agent A-187[g] | — | — | 0.26 | 0.26 | 0.52 | — | |
| Coupling agent A-186[h] | — | — | — | — | 0.52 | — | |
| Coupling agent Z-6020[i] | — | — | — | — | — | — | |
| Coupling agent A-1100[j] | — | — | — | — | — | 0.52 | |
| Titanate GT DOPP-1385[k] | — | — | — | — | — | — | |
| Titanate TTOP-12[l] | — | — | — | — | — | — | |
| Cationic silane Z-6032[m] | — | — | — | — | — | — | |
| PHYSICAL PROPERTIES: | | | | | | | |
| Tensile yield strength, psi | 9,910 | 7,750 | 8,760 | 9,070 | 8,360 | 8,400 | |
| Flexural strength, psi | 17,700 | 14,100 | 15,500 | 15,400 | 14,600 | 14,600 | |
| Flexural modulus, 10³ psi | 921 | 872 | 820 | 897 | 917 | 750 | |
| Izod Impact, ¼" bar, ft.-lb./in. | 1.2 | 1.7 | 2.3 | 2.4 | 1.8 | 2.0 | |
| Izod Impact, ⅛" bar, ft.-lb./in. | 1.2 | 1.2 | 1.4 | 1.4 | 1.2 | 1.3 | |
| Heat Deflection Temperature, °C | 224 | 219 | 222 | 221 | 222 | 220 | |
| COMPOSITION (in %): | | | | | | | |
| Polypivalolactone[a] | 69.28 | 69.28 | 69.28 | 69.28 | 69.64 | 69.28 | 69.28 |
| LVN | 2.1 | 2.1 | 2.1 | 2.1 | 2.1 | 2.1 | 1.4 |
| Glass fiber[b] | — | — | — | — | — | — | — |
| Glass fiber[c] | — | — | — | — | 29.94 | 29.79 | — |
| Glass fiber[d] | 29.79 | 29.79 | 29.79 | 29.79 | — | — | 29.79 |
| Ca Mg aluminosilicate[e] | — | — | — | — | — | — | — |
| Titanium dioxide | 0.35 | 0.35 | 0.35 | 0.35 | 0.35 | 0.35 | 0.35 |
| Antioxidant[f] | 0.07 | 0.07 | 0.07 | 0.07 | 0.07 | 0.07 | 0.07 |
| Coupling agent A-187[g] | — | — | — | — | — | 0.52 | — |
| Coupling agent A-186[h] | — | — | — | — | — | — | — |
| Coupling agent Z-6020[i] | 0.52 | — | — | — | — | — | 0.52 |
| Coupling agent A-1100[j] | — | — | — | — | — | — | — |
| Titanate GT DOPP-1385[k] | — | — | 0.52 | — | — | — | — |
| Titanate TTOP-12[l] | — | — | — | 0.52 | — | — | — |
| Cationic silane Z-6032[m] | — | 0.52 | — | — | — | — | — |
| PHYSICAL PROPERTIES: | | | | | | | |
| Tensile yield strength, psi | 8,100 | 8,180 | 5,770 | 5,650 | 7,140 | 9,230 | 8,870 |
| Flexural strength, psi | 14,500 | 13,400 | 10,500 | 10,300 | 12,200 | 15,900 | 14,400 |
| Flexural modulus, 10³ psi | 864 | 745 | 874 | 597 | 852 | 834 | 840 |
| Izod Impact, ¼" bar, ft.-lb./in. | 1.8 | 1.7 | 1.6 | 1.6 | 0.8 | 1.1 | 1.1 |
| Izod Impact, ⅛" bar, ft.-lb./in. | 1.2 | 1.0 | 1.0 | 1.1 | 0.9 | 1.2 | 1.2 |
| Heat Deflection | | | | | | | |

| Temperature, °C | 220 | 220 | 208 | 197 | 212 | 218 | 219 |
|---|---|---|---|---|---|---|---|

Footnotes:
<sup>a</sup>Stabilized with 0.05 weight percent of dicetyl sulfide.
<sup>b</sup>Glass fibers made by Owens Corning, Inc. under the name Fiber-glass 2219-64-3 having a fiber length of about ¼ inch.
<sup>c</sup>Glass fibers made by Owens Corning, Inc. under the name Fiberglass 419AA having a fiber length of about ¼ inch.
<sup>d</sup>Glass fibers made by PPG under the name Fiberglass 3080M having a fiber length of about ¼ inch.
<sup>e</sup>Processed Mineral Fiber, Jim Walter Resources, Inc., average aspect ratio 55.
<sup>f</sup>1,3,5-Trimethyl-2,4,6-tris(3,5-di-tert-butyl-4-hydroxybenzyl) benzene, Ethyl Corporation.
<sup>g</sup>γ-Glycidoxypropyltrimethoxysilane, Union Carbide Corporation.
<sup>h</sup>β-(3,4-epoxycyclohexyl)-ethyltrimethoxysilane, Union Carbide Corporation.
<sup>i</sup>N-β-(aminoethyl)-γ-aminopropyltrimethoxysilane, Dow-Corning.
<sup>j</sup>γ-Aminopropyltriethoxysilane, Union Carbide Corporation.
<sup>k</sup>Titanium di(dioctylpyrophosphate)oxyacetate, Kenrich Petrochemicals, Inc.
<sup>l</sup>Isopropyl tri(dioctylphosphate)titanate, Kenrich Petrochemicals, Inc.
<sup>m</sup>N-β-(N-vinylbenzylamino)ethyl-γ-aminopropyltrimethoxysilane monohydrogen chloride.
<sup>n</sup>Ionox 330, Shell Chemical (chemically identical to Ethyl Antioxidant described in footnote f).

Comparison of example 1 with example 3 and example 2 with example 17 shows the relatively poor response in tensile, flexural and impact strength of polypivalolactone to conventional glass fiber reinforcement.

Comparison of example 3 with example 4 and example 8 with examples 9 and 10 shows the effectiveness of incorporating 0.26–0.52 percent of glycidoxypropyltrimethoxysilane into the blend of polypivalolactone and fiberglass at the compounding stage. Comparison of example 17 with example 18 also shows this with another grade of commercial fiberglass.

Examples 6 and 10, and 7 and 8 show the effect of the LVN of the polypivalolactone on physical properties.

Example 11, when compared with example 8, shows the beneficial effects of another type of epoxy silane. Examples 12 and 13 show the beneficial effect of two types of aminosilane, and example 14 shows the beneficial effect of a cationic silane.

Examples 15 and 16, when compared with example 8, show that titanate coupling agents are ineffective.

Example 5 shows that when part of the glass fibers are replaced by a particulate filler having an aspect ratio greater than 30, the strength properties of the completely glass-reinforced polypivalolactone are substantially retained.

sure of long-term deformation under load at elevated temperatures and the heat deflection temperature being a measure of shorter term deformation under load at still higher temperatures.

We claim:

1. A thermoplastic composition comprising an intimate blend of polypivalolactone, a glass fiber reinforcing filler and a coupling agent having the formula

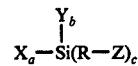

where X is a hydrolyzable group capable of reaction with a hydroxyl group, Y is hydrogen or a monovalent hydrocarbon group, R is a divalent hydrocarbon group having from 1 to about 20 carbon atoms, Z is a primary or secondary amino or epoxy group or a secondary amino monohydrogen halide, "a" is an integer from 1 to 3, "b" is an integer from 0 to 2, "c" is an integer from 1 to 3, and the sum of $a + b + c = 4$, said coupling agent comprising from about 0.1 to about 2 weight percent based on the total weight of said compositions, and said glass fiber reinforcing filler comprising from about 15 to about 60 weight percent based on the total weight of said compositions.

TABLE II

| PROPERTY: | Glass-Reinforced Polypivalolactone (Composition of Example 5) | Glass-Reinforced Polybutylene Terephthalate (Vituf VFR 4981*) |
|---|---|---|
| Tensile yield strength at 150° C, psi | 5,540 | 5,850 |
| Flexural strength at 150° C, psi | 10,500 | 10,700 |
| Flexural elastic modulus at 150° C, 10³ psi | 458 | 330 |
| Flexural creep modulus, 2,000 psi stress, at 100° C for 170 hrs, 10³ psi | 319 | 352 |
| Heat Deflection Temperature, °C | | |
| at 64 psi stress | 230 | 217 |
| at 264 psi stress | 225 | 205 |
| Izod impact strength, ft.-lb./in. | | |
| ⅛ inch bar | 1.5 | 1.3 |
| ¼ inch bar | 1.4 | 1.6 |
| Tensile yield strength at 23° C, psi | 11,300 | 16,400 |
| Flexural strength at 23° C, psi | 18,900 | 29,400 |
| Flexural modulus at 23° C, psi | 1,030 | 1,120 |

*Goodyear Chemicals

Table II shows that tensile and flexural strengths of the glass-reinforced composition of example 5 are comparable to that of a commercial glass-reinforced thermoplastic polyester and that the flexural elastic modulus (a measure of stiffness) at elevated temperatures is actually greater. The table also shows the comparable deformation resistance of the two types of glass-reinforced thermoplastics, the flexural creep modulus being a measure of long-term deformation under load at elevated temperatures and the heat deflection temperature being a measure of shorter term deformation under load at still higher temperatures.

2. The thermoplastic composition of claim 1 wherein said coupling agent comprises from about 0.2 to about 1 weight percent based on the total weight of said composition and said reinforcing filler comprises from about 20 weight percent to about 50 weight percent based on the total weight of said composition.

3. The thermoplastic composition of claim 1 wherein said polypivalolactone has an LVN of from about 0.8 to about 2.5.

4. The thermoplastic composition of claim 1 wherein said polypivalolactone has an LVN of from about 0.9 to about 2.3.

5. The thermoplastic composition of claim 1 wherein said polypivalolactone has an LVN of from about 0.9 to about 1.6.

6. The thermoplastic composition of claim 1 wherein said glass fiber reinforcing filler has a length of from about 1/16 inch to about ½ inch.

7. The thermoplastic composition of claim 1 wherein said glass fiber reinforcing filler has a length of from about ⅛ inch to about ¼ inch.

8. The thermoplastic composition of claim 1 wherein said composition includes from about 0.01 to about 3 weight percent, based on the total weight of said composition, of a nucleating agent.

9. The thermoplastic composition of claim 1 wherein said composition includes a particulate filler having a maximum particle size of about 900 microns, an average aspect ratio greater than 10, said particulate filler comprising not more than 40 percent by weight of the total composition.

10. The thermoplastic composition of claim 1 wherein said composition includes a particulate filler having a maximum particle size of about 900 microns, an average aspect ratio greater than 30, said particulate filler comprising not more than 20 percent by weight of the total composition.

11. The thermoplastic composition of claim 10 wherein said particulate filler is calcium sulfate single crystal whiskers.

12. The thermoplastic composition of claim 10 wherein said particulate filler is potassium titanate single crystals.

13. The thermoplastic composition of claim 10 wherein said particulate filler is fibrous calcium magnesium aluminum silicate.

14. The thermoplastic composition of claim 10 wherein said particulate filler is asbestos.

15. The thermoplastic composition of claim 10 wherein said particulate filler is wollastonite.

16. The thermoplastic composition of claim 10 wherein said particulate filler is mica.

17. The thermoplastic composition of claim 1 wherein said coupling agent is a γ-aminoalkyltrialkoxysilane.

18. The thermoplastic composition of claim 1 wherein said coupling agent is a γ-aminopropyltriethoxysilane.

19. The thermoplastic composition of claim 1 wherein said coupling agent is a γ-glycidoxyalkyltrialkoxysilane.

20. the thermoplastic composition of claim 1 wherein said coupling agent is γ-glycidoxypropyltrimethoxysilane.

21. The thermoplastic composition of claim 1 wherein said coupling agent is an N-β-(aminoethyl)-γ-aminoalkyltrialkoxysilane.

22. The thermoplastic composition of claim 1 wherein said coupling agent is 3,4-epoxycyclohexylethyltrimethoxysilane.

23. The thermoplastic composition of claim 1 wherein said coupling agent is N-β(N-vinylbenzylamino)ethyl-γ-aminopropyltrimethoxysilane monohydrogen chloride.

24. A method for preparing a thermoplastic composition comprising:
a. dispersing a coupling agent on a glass fiber reinforcing filler, said coupling agent having the formula $$X_a-Si(R-Z)_c$$
$$\overset{|}{Y_b}$$

wherein X is a hydrolyzable group capable of reacting with a hydroxyl group, Y is hydrogen or a monovalent hydrocarbon group, R is a divalent hydrocarbon group having from 1 to about 20 carbon atoms, Z is a primary or secondary amino or epoxy group or a secondary amino monohydrogen halide, "a" is an integer from 1 to 3, "b" is an integer from 0 to 2, "c" is an integer from 1 to 3, and the sum of $a + b + c = 4$, said coupling agent comprising from about 0.01 to about 2 weight percent based on the total weight of the composition, and said glass fiber reinforcing filler comprising from about 15 to about 60 weight percent based on the total weight of the composition,
b. intimately blending said dispersion of coupling agent and glass fiber reinforcing filler, and
c. forming said mixture into a solid composition.

25. The method of claim 24 wherein said coupling agent comprises from about 0.2 to about 1 weight percent based on the total weight of the composition and said reinforcing filler comprises from about 20 weight percent to about 50 weight percent based on the total weight of the composition.

26. The method of claim 24 wherein said polypivalolactone has an LVN of from about 0.8 to about 2.5.

27. The method of claim 24 wherein said polypivalolactone has an LVN of from about 0.9 to about 2.3.

28. The method of claim 24 wherein said polypivalolactone has an LVN of from about 0.9 to about 1.6.

29. The method of claim 24 wherein said glass fiber reinforcing filler has a length of from about 1/16 inch to about ½ inch.

30. The method of claim 24 wherein said glass fiber reinforcing filler has a length of from about ⅛ inch to about ¼ inch.

31. The method of claim 24 wherein said composition includes from about 0.01 to about 3 weight percent, based on the total weight of said composition, of a nucleating agent.

32. The method of claim 24 wherein said composition includes a particulate filler having a maximum particle size of about 900 microns, an average aspect ratio greater than 10, said particulate filler comprising not more than 40 percent by weight of the total composition.

33. The method of claim 24 wherein said composition includes a particulate filler having a maximum particle size of about 900 microns, an average aspect ratio greater than 30, said particulate filler comprising not more than 20 percent by weight of the total composition.

34. The method of claim 24 wherein said particulate filler is calcium sulfate single crystal whiskers.

35. The method of claim 33 wherein said particulate filler is potassium titanate single crystals.

36. The method of claim 33 wherein said particulate filler is fibrous calcium magnesium aluminum silicate.

37. The method of claim 33 wherein said particulate filler is asbestos.

38. The method of claim 33 wherein said particulate filler is wollastonite.

39. The method of claim 33 wherein said particulate filler is mica.

40. The method of claim 24 wherein said coupling agent is a γ-aminoalkyltrialkoxysilane.

41. The method of claim 24 wherein said coupling agent is γ-aminopropyltriethoxysilane.

42. The method of claim 24 wherein said coupling agent is a γ-glycidoxyalkyltrialkoxysilane.

43. The method of claim 24 wherein said coupling agent is γ-glycidoxypropyltrimethoxysilane.

44. The method of claim 24 wherein said coupling agent is an N-β-(aminoethyl)-γ-aminoalkyltrialkoxysilane.

45. The method of claim 24 wherein said coupling agent is 3,4-epoxycyclohexylethyltrimethoxysilane.

46. The method of claim 24 wherein said coupling agent is N-β(N-vinylbenzylamino)ethyl-γ-aminopropyltrimethoxysilane.

* * * * *

UNITED STATES PATENT OFFICE
CERTIFICATE OF CORRECTION

PATENT NO. : 4,116,922

DATED : September 26, 1978

INVENTOR(S) : Edwin D. Hornbaker, et al

Page 1 of 3

It is certified that error appears in the above-identified patent and that said Letters Patent are hereby corrected as shown below:

The "TABLE OF EXAMPLES" in columns 5 thru 8 should be deleted to appear as shown below:

TABLE OF EXAMPLES
(1 thru 6)

| | 1 | 2 | 3 | 4 | 5 | 6 |
|---|---|---|---|---|---|---|
| COMPOSITION (in %): | | | | | | |
| Polypivalolactone [a] | 99.4 | 99.4 | 69.59 | 69.23 | 69.21 | 69.28 |
| LVN | 1.4 | 2.1 | 1.4 | 1.4 | 1.4 | 1.4 |
| Glass fiber [b] | - | - | 29.99 | 29.84 | 19.90 | - |
| Glass fiber [c] | - | - | - | - | - | - |
| Glass fiber [d] | - | - | - | - | - | 29.79 |
| Ca Mg aluminosilicate [e] | - | - | - | - | 9.95 | - |
| Titanium dioxide | 0.5 | 0.5 | 0.35 | 0.34 | 0.35 | 0.35 |
| Antioxidant [f] | 0.1[n] | 0.1[n] | 0.07 | 0.07 | 0.07 | 0.07 |
| Coupling agent A-187 [g] | - | - | - | 0.52 | 0.52 | 0.52 |
| Coupling agent A-186 [h] | - | - | - | - | - | - |
| Coupling agent Z-6020 [i] | - | - | - | - | - | - |
| Coupling agent A-1100 [j] | - | - | - | - | - | - |
| Titanate GT DOPP-1385 [k] | - | - | - | - | - | - |
| Titanate TTOP-12 [l] | - | - | - | - | - | - |
| Cationic silane Z-6032 [m] | - | - | - | - | - | - |
| PHYSICAL PROPERTIES: | | | | | | |
| Tensile yield strength, psi | 5,510 | 5,390 | 8,100 | 10,700 | 10,200 | 11,300 |
| Flexural strength, psi | 9,495 | 9,391 | 13,200 | 17,300 | 16,700 | 18,900 |
| Flexural modulus, $10^3$ psi | 360 | 290 | 1,170 | 1,140 | 970 | 1,030 |
| Izod Impact, 1/4" bar, ft.-lb./in. | 0.7 | 0.8 | - | - | - | 1.4 |
| Izod Impact, 1/8" bar, ft.-lb./in. | 0.7 | 1.0 | 0.94 | 1.4 | 1.4 | 1.5 |
| Heat Deflection Temperature, °C | 153 | 133 | 225 | 220 | 216 | 225 |

UNITED STATES PATENT OFFICE
CERTIFICATE OF CORRECTION

PATENT NO. : 4,116,922
DATED : September 26, 1978
INVENTOR(S) : Edwin D. Hornbaker, et al It is certified that error appears in the above-identified patent and that said Letters Patent are hereby corrected as shown below:

TABLE OF EXAMPLES
(7 thru 12)

| | 7 | 8 | 9 | 10 | 11 | 12 |
|---|---|---|---|---|---|---|
| COMPOSITION (in %): | | | | | | |
| Polypivalolactone [a] | 69.64 | 69.64 | 69.46 | 69.28 | 69.28 | 69.28 |
| LVN | 1.0 | 2.1 | 2.1 | 2.1 | 2.1 | 2.1 |
| Glass fiber [b] | - | - | - | - | - | - |
| Glass fiber [c] | - | - | - | - | - | - |
| Glass fiber [d] | 29.94 | 29.94 | 29.87 | 29.79 | 29.79 | 29.79 |
| Ca Mg aluminosilicate [e] | - | - | - | - | - | - |
| Titanium dioxide | 0.35 | 0.35 | 0.35 | 0.35 | 0.35 | 0.35 |
| Antioxidant [f] | 0.07 | 0.07 | 0.07 | 0.07 | 0.07 | 0.07 |
| Coupling agent A-187 [g] | - | - | 0.26 | 0.52 | - | - |
| Coupling agent A-186 [h] | - | - | - | - | 0.52 | - |
| Coupling agent Z-6020 [i] | - | - | - | - | - | - |
| Coupling agent A-1100 [j] | - | - | - | - | - | 0.52 |
| Titanate GT DOPP-1385 [k] | - | - | - | - | - | - |
| Titanate TTOP-12 [l] | - | - | - | - | - | - |
| Cationic silane Z-6032 [m] | - | - | - | - | - | - |
| PHYSICAL PROPERTIES: | | | | | | |
| Tensile yield strength, psi | 9,910 | 7,750 | 8,760 | 9,070 | 8,360 | 8,400 |
| Flexural strength, psi | 17,700 | 14,100 | 15,500 | 15,400 | 14,600 | 14,600 |
| Flexural modulus, $10^3$ psi | 921 | 872 | 820 | 897 | 917 | 750 |
| Izod Impact, 1/4" bar, ft.-lb./in. | 1.2 | 1.7 | 2.3 | 2.4 | 1.8 | 2.0 |
| Izod Impact, 1/8" bar, ft.-lb./in. | 1.2 | 1.2 | 1.4 | 1.4 | 1.2 | 1.3 |
| Heat Deflection Temperature, °C | 224 | 219 | 222 | 221 | 222 | 220 |

UNITED STATES PATENT OFFICE
CERTIFICATE OF CORRECTION

PATENT NO. : 4,116,922

DATED : September 26, 1978

INVENTOR(S) : Edwin D. Hornbaker, et al

It is certified that error appears in the above-identified patent and that said Letters Patent are hereby corrected as shown below:

TABLE OF EXAMPLES
(13 thru 19)

| | 13 | 14 | 15 | 16 | 17 | 18 | 19 |
|---|---|---|---|---|---|---|---|
| COMPOSITION (in %): | | | | | | | |
| Polypivalolactone [a] | 69.28 | 69.28 | 69.28 | 69.28 | 69.64 | 69.28 | 69.28 |
| DVN | 2.1 | 2.1 | 2.1 | 2.1 | 2.1 | 2.1 | 1.4 |
| Glass fiber [b] | - | - | - | - | - | - | - |
| Glass fiber [c] | - | - | - | - | 29.94 | 29.79 | - |
| Glass fiber [d] | 29.79 | 29.79 | 29.79 | 29.79 | - | - | 29.79 |
| Ca Mg aluminosilicate [e] | - | - | - | - | - | - | - |
| Titanium dioxide | 0.35 | 0.35 | 0.35 | 0.35 | 0.35 | 0.35 | 0.35 |
| Antioxidant [f] | 0.07 | 0.07 | 0.07 | 0.07 | 0.07 | 0.07 | 0.07 |
| Coupling agent A-187 [g] | - | - | - | - | - | 0.52 | - |
| Coupling agent A-186 [h] | - | - | - | - | - | - | 0.52 |
| Coupling agent Z-6020 [i] | 0.52 | - | - | - | - | - | - |
| Coupling agent A-1100 [j] | - | - | - | - | - | - | - |
| Titanate GT DOPP-1385 [k] | - | - | 0.52 | - | - | - | - |
| Titanate TTOP-12 [l] | - | - | - | 0.52 | - | - | - |
| Cationic silane Z-6032 [m] | - | 0.52 | - | - | - | - | - |
| PHYSICAL PROPERTIES: | | | | | | | |
| Tensile yield strength, psi | 8,100 | 8,180 | 5,770 | 5,650 | 7,140 | 9,230 | 8,870 |
| Flexural strength, psi | 14,500 | 13,400 | 10,500 | 10,300 | 12,200 | 15,900 | 14,400 |
| Flexural modulus, $10^3$ psi | 864 | 745 | 874 | 597 | 852 | 834 | 840 |
| Izod Impact, 1/4" bar, ft.-lb./in. | 1.8 | 1.7 | 1.6 | 1.6 | 0.8 | 1.1 | 1.1 |
| Izod Impact, 1/8" bar, ft.-lb./in. | 1.2 | 1.0 | 1.0 | 1.1 | 0.9 | 1.2 | 1.2 |
| Heat Deflection Temperature, °C | 220 | 220 | 208 | 197 | 212 | 218 | 219 |

Signed and Sealed this

Eleventh Day of December 1979

[SEAL]

Attest:

SIDNEY A. DIAMOND

Attesting Officer

Commissioner of Patents and Trademarks